(12) United States Patent
O'Brien, III et al.

(10) Patent No.: US 9,298,636 B1
(45) Date of Patent: Mar. 29, 2016

(54) MANAGING DATA STORAGE

(75) Inventors: Walter A O'Brien, III, Westborough, MA (US); Thomas N Dibb, Ruthland, MA (US)

(73) Assignee: EMC Corporation, Hopkinton, MA (US)

( * ) Notice: Subject to any disclaimer, the term of this patent is extended or adjusted under 35 U.S.C. 154(b) by 450 days.

(21) Appl. No.: 13/248,219

(22) Filed: Sep. 29, 2011

(51) Int. Cl.
*G06F 12/08* (2006.01)

(52) U.S. Cl.
CPC .... *G06F 12/0888* (2013.01); *G06F 2212/1024* (2013.01)

(58) Field of Classification Search
CPC ............ G06F 12/0866; G06F 12/0868; G06F 12/0888; G06F 2212/1016; G06F 2212/1024
See application file for complete search history.

(56) References Cited

U.S. PATENT DOCUMENTS

| | | | | |
|---|---|---|---|---|
| 6,240,461 B1 * | 5/2001 | Cieslak et al. | | 709/235 |
| 2003/0079027 A1 * | 4/2003 | Slocombe et al. | | 709/229 |
| 2004/0078790 A1 * | 4/2004 | Wu et al. | | 717/154 |
| 2004/0133886 A1 * | 7/2004 | Wu | | 717/154 |
| 2007/0005880 A1 * | 1/2007 | Burroughs et al. | | 711/112 |
| 2007/0067417 A1 * | 3/2007 | Burroughs et al. | | 709/218 |
| 2008/0082856 A1 * | 4/2008 | French et al. | | 714/2 |
| 2008/0104329 A1 * | 5/2008 | Gaither et al. | | 711/138 |
| 2008/0155307 A1 * | 6/2008 | French et al. | | 714/3 |
| 2008/0172526 A1 * | 7/2008 | Verma et al. | | 711/114 |

* cited by examiner

*Primary Examiner* — Michael Krofcheck
(74) *Attorney, Agent, or Firm* — Krishnendu Gupta; Jason A. Reyes

(57) ABSTRACT

A method and a system for use in managing data storage is disclosed. Data storage is managed in a data storage system comprising a first and a second storage processor and a plurality of data storage devices. The first and the second storage processor having respective caches configured to mirror each other. A write I/O is received in the data storage system, wherein the write I/O is an operation for updating data storage in the data storage system. Load associated with the first and second storage processor in the data storage system is determined. The cache is bypassed and write I/O is delivered to the plurality of data storage devices in the data storage system in response to determining a heavy load associated with the first and second storage processor in the data storage system.

14 Claims, 3 Drawing Sheets

MANAGING DATA STORAGE

FIELD OF THE INVENTION

The present invention relates to managing data storage.

DESCRIPTION OF THE PRIOR ART

Computer systems may include different resources used by one or more hosts. Resources and hosts in a computer system may be interconnected by one or more communication connections. These resources may include, for example, data storage devices such as those included in the data storage systems manufactured by EMC Corporation. These data storage systems may be coupled to one or more servers or hosts and provide storage services to each host. Multiple data storage systems from one or more different vendors may be connected and may provide common data storage for one or more hosts in a computer system.

The hosts may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems, internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of the host is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified using its object identifier and the object identifier may be independent of both the physical and logical location(s) at which the content unit is stored (although it is not required to be because in some embodiments the storage system may use the object identifier to inform where a content unit is stored in a storage system). From the perspective of the host accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same.

It is known in the art that data storage systems may utilize a variety of different techniques in connection with write or update operations. For example, block I/O storage systems or OAS systems or other storage systems, such as a file system storage architecture, may use write back caching in connection with these operations. With write-back caching, the data storage system may temporarily cache data received from a host within its storage cache and destage the cached data at different times onto the physical disk drives. As is known in the art, the cache may be implemented using fast storage media such as RAM (random access memory), dynamic RAM (DRAM), FLASH memory or FLASH drives. The data storage system may utilize a backup or secondary power supply for use in connection with preventing loss of cached data in the event of a power failure. In the event of a power failure, the data storage system may utilize the backup power supply to provide power to the storage processor and physical data storage devices of the data storage system for a short period of time. During this period of time, the storage processor stores the data from its cache to a dedicated area on the storage devices that may be referred to as a "vault" so that the vault includes the cached data which has not yet been destaged onto the physical storage devices.

It should be noted that a data storage system may include multiple storage processors storing data to a same set of storage devices. Each of the storage processors may have its own cache so that cached data for the above operations, as well as possibly other cached data, may be mirrored in the caches of the storage processors. Multiple storage processors may be desirable for use in providing fault tolerance and the like.

SUMMARY OF THE INVENTION

A method and a system for use in managing data storage is disclosed. Data storage is managed in a data storage system comprising a first and a second storage processor and a plurality of data storage devices. The first and the second storage processor having respective caches configured to mirror each other. A write I/O is received in the data storage system, wherein the write I/O is an operation for updating data storage in the data storage system. Load associated with the first and second storage processor in the data storage system is determined. The cache is bypassed and write I/O is delivered to the plurality of data storage devices in the data storage system in response to determining a heavy load associated with the first and second storage processor in the data storage system.

BRIEF DESCRIPTION OF THE DRAWINGS

The invention will be more clearly understood from the following description of preferred embodiments thereof which are given by way of example only with reference to the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There is described below a technique for use in managing data storage. The technique is suitable for managing, but not limited to, high bandwidth write requests that optimizes the use of storage processor compute and memory system resources to improve the throughput achievable on the storage processor. It does so by dynamically deciding which I/Os to mirror and which not to mirror between the storage processors. By selectively mirroring writes, it improves the system throughput under heavy load.

Conventionally, the prior art techniques nearly always mirrored write data between controllers and performed a later lazy flush using substantial CPU and memory system resources. In other conventional approaches, the techniques never mirrored write data between controllers and limited the size of I/Os that can be performed on the backend.

The dynamic bandwidth optimization can deliver advantages over these approaches. For example, it can reduce CPU and memory system resources by not mirroring all the data.

Figure 1:
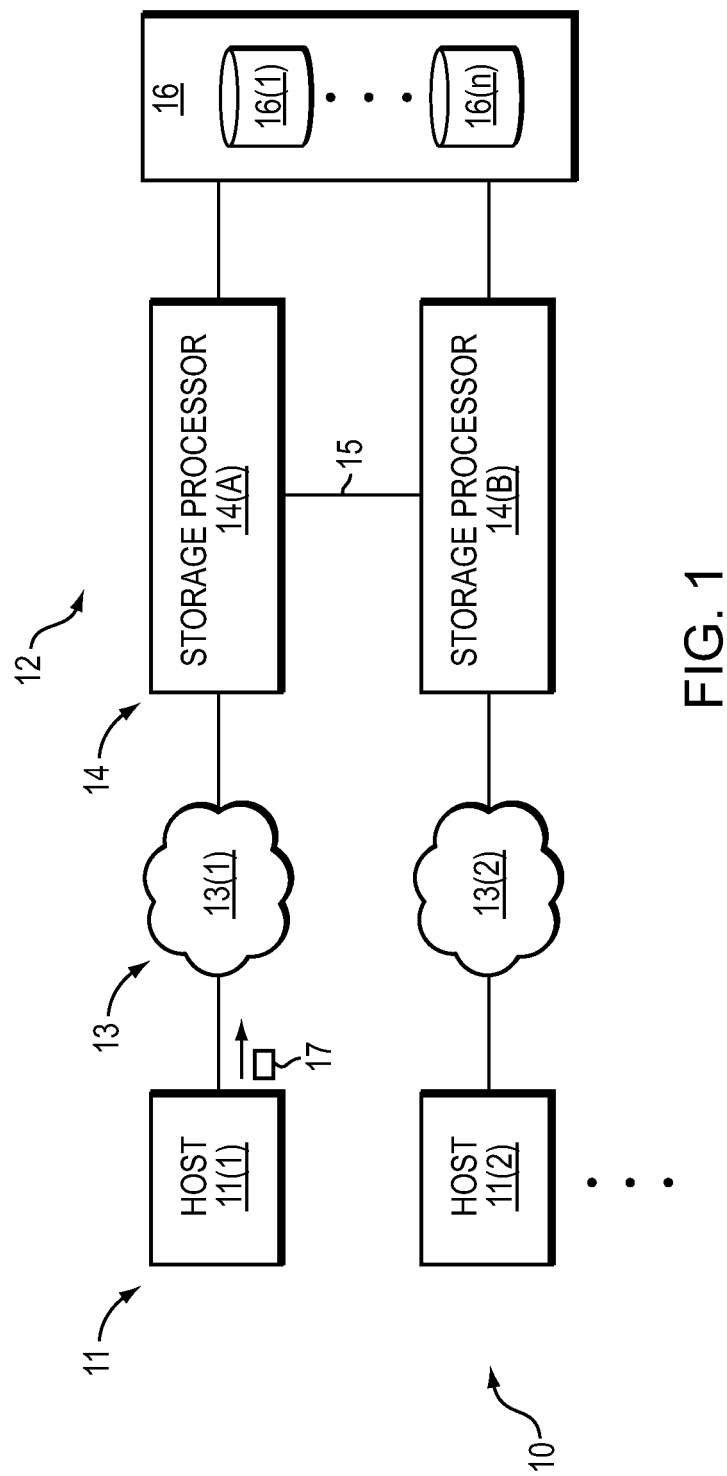
FIG. 1 is a block diagram of a system that may utilize the techniques described herein.

Referring to FIG. 1, there is illustrated an example of an embodiment of a system 10 that may be used in connection with performing the techniques described herein. The system 10 comprises host computers 11(1), 11(2), . . . (collectively, hosts 11) connectable to a data storage system 12 via communications medium 13(1), 13(2), . . . (collectively, communications media 13). The data storage system 12 comprises multiple storage processors 14(A), 14(B) (collectively, storage processors 14), a cache mirror bus 15 and a set of data storage devices, for example, disk drives 16(1), . . . 16(N) (collectively, disk drives 16). For illustration purposes only, the host 11(1) is shown communicating with storage processor 14(A) and the host 11(2) is shown communicating with storage processor 14(B). However, it will be readily apparent to those skilled in the art that this is for illustration purposes and that the host 11(1) may have connections with and communicate with any storage processor 14. It will also be apparent that similar comments also apply to the other host 11(2). The storage processors 14 may be configured to perform data storage operations (e.g., read operations, write operations, etc.) on behalf of the hosts 11. The cache mirror bus 15 may be configured to convey data between caches of the storage processors 14 thus enabling cache mirroring between the storage processors 14. The set of disk drives 16 enables the data storage system 12 to store and retrieve data on behalf of the hosts 11 in a fault tolerant, non-volatile manner (e.g., using a RAID scheme).

Each storage processor 14 may be configured to perform write-back caching in response to write operations 17 from the hosts 11 while both storage processors 14 are in operation. That is the storage processor 14 acknowledges completion of a write operation 17 to the host after the data has been stored in its cache as well as mirrored to the cache of the other storage processor. Such operations enable the data storage system 12 to provide improved response times.

It will be appreciated by those skilled in the art that cache mirroring as described above may be performed over any communication channel between storage processors which may include frontend interfaces, backend interfaces, or some dedicated storage processor to storage processor interfaces. Additionally, it will be appreciated that there may be more than one interface on a storage processor that can be used for cache mirroring and the implementation may distribute mirroring requests across the multiple interfaces based on some load balancing policy. Moreover, it will be appreciated that cache mirroring may be performed over hardwired interfaces like dedicated cables or signals carried over a mid-plane between controllers. Alternatively cache mirror may be performed over networks such as Ethernet, fibre channel, SAS, or PCI networks. Furthermore, it will be appreciated that cache mirroring may be performed between collections of more than two storage processors, with cache data being hosted in two or more storage processors to protect against storage processor failure.

Figure 2:
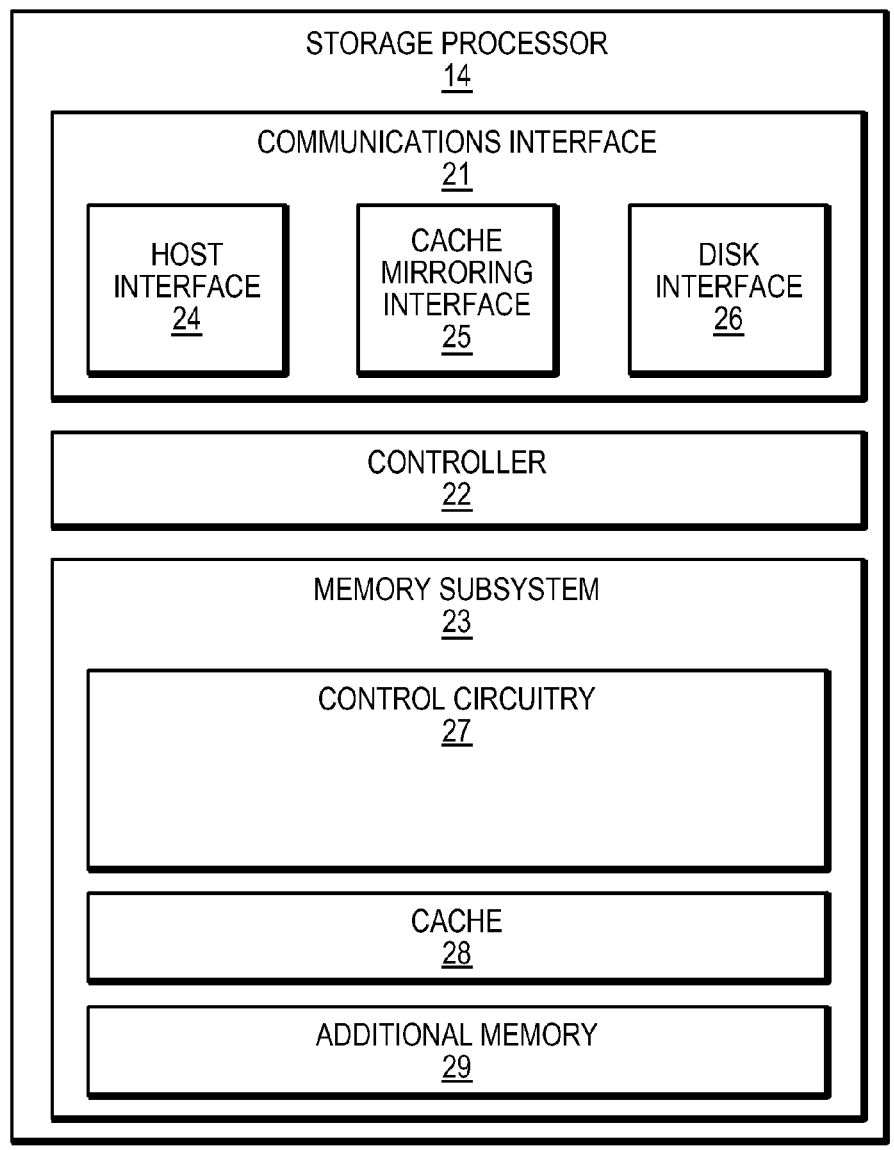
FIG. 2 is a block diagram of components of a system that may utilize the techniques described herein.

Referring to FIG. 2, there is illustrated a block diagram example of a storage processor 14 as illustrated in the data storage system 12 of FIG. 1. The storage processor 14 may include a communications interface 21, a controller 22 and a memory subsystem 23. The communications interface 21 may include a host interface 24, a cache mirroring interface 25, and a disk interface 26. The memory subsystem 23 may include a control circuit 27, cache 28 and additional memory 29. The additional memory 29 includes operating system storage, firmware for storing BIOS and POST code, optional flash memory, etc.

It will be appreciated that the cache 28 may have separate read and write cache memory in the storage processor. Alternatively, it will be appreciated that the cache 28 may be a unified read/write cache with pages of the cache holding cache read data, dirty cached write data, or clean cached write data. The dirty cached write data may be data written by the host that has not yet been written to disk. The clean cached write data may be data written by the host that has been written to disk but is still in the cache. It will also be appreciated that in certain instances the cached read data may not be mirrored between storage processors but cached write data may be mirrored.

The communications interface 21 may be configured to provide connectivity from the storage processor 14 to various other components. In particular, the host interface 24 may be configured to connect the storage processor 14 to one or more hosts 11 through the communications media 13. The cache mirroring interface 25 may be configured to connect the storage processor 14 (e.g., the storage processor 14(A)) to another storage processor 14 (e.g., the storage processor 14(B)) to enable cache mirroring through the cache mirror bus 15. The disk interface 26 may be configured to connect the storage processor 14 to the set of disk drives 16.

The controller 22 may be configured to carryout data storage operations on behalf of one or more of the hosts 11 through the communications interface 21 (e.g., the write operations 17 in FIG. 1). In some arrangements, the controller 22 may be implemented as a set of processors running an operating system which is capable of being stored in a designated area on one or more of the disk drives 16. In other arrangements, the controller 22 may be implemented as logic circuitry (e.g., Application Specific Integrated Circuitry, Field Programmable Gate Arrays, etc.), microprocessors or processor chip sets, analog circuitry, various combinations thereof, and so on.

The memory subsystem 23 may be configured to provide memory services to the controller 22. In particular, the control circuitry 27 of the memory subsystem 23 may be configured to provide logic for use with the cache 28 so as to manage the data storage as described herein. It will be appreciated that the control circuit 27 may be further capable of performing other tasks using the additional memory 29 such as vaulting contents of the cache 28 into non-volatile flash memory or disk drive memory in response to a failure of the controller 22 and the like.

Figure 3:
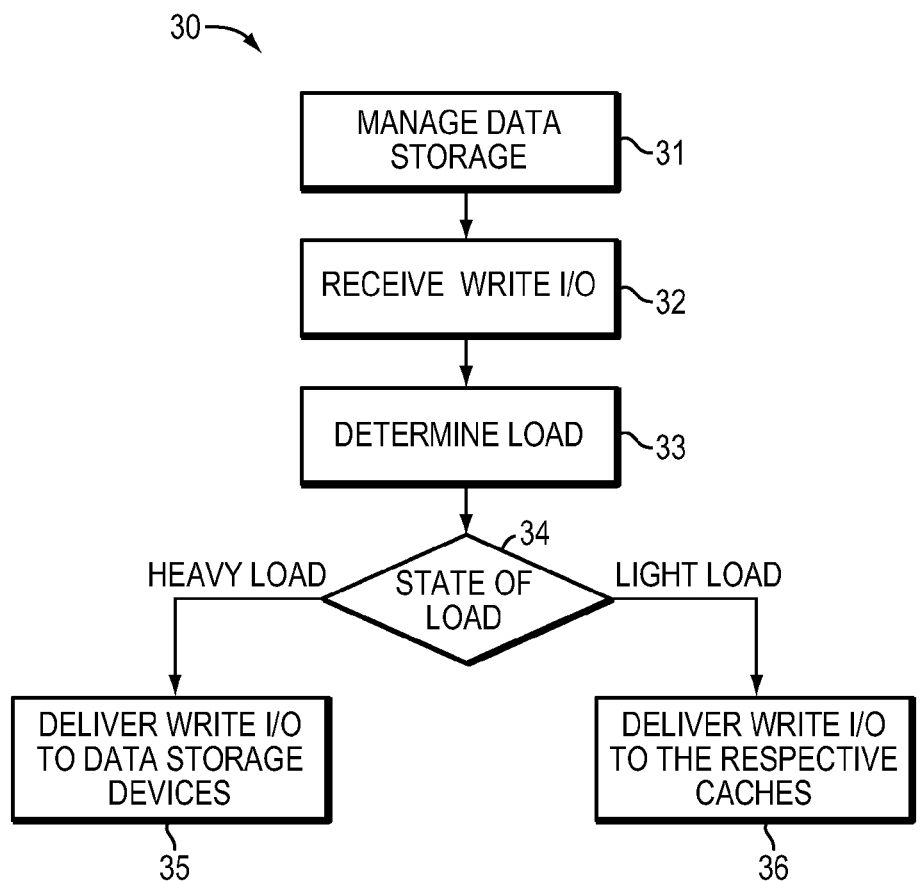
FIG. 3 is a flowchart summarizing the steps for managing data storage.

Referring to FIG. 3, there is illustrated a flowchart 30 summarizing the steps for managing data storage. It will be appreciated the aforementioned system and example may be configured for performing the technique summarized in the flowchart and described herein. The technique can manage data storage 31 in a data storage system comprising a first and a second storage processor and a plurality of data storage devices wherein the first and second storage processors have respective caches configured to mirror each other. The data storage devices may be disk drives. The above features have all been described in relation to previous figures and similar comments may also apply to the features described hereafter. The technique can receive 32 a write I/O in the data storage system. It will be appreciated by those skilled in the art that a write I/O or write operation is any operation that updates data storage in the data storage system. For example, the write I/O may be the data to be forwarded to the data storage devices in the data storage system. In a further example, the write I/O may initially be a command or request from a host for permission to forward data associated with the write I/O to the data storage system. The data may subsequently be forwarded in response to a reply from the data storage system that it is in order to send the data in connection with the write I/O. In a further example, SCSI commands such as WRITE SAME, EXTENDED COPY and the like may be considered for the purposes of this disclosure as write I/O. In a still further example, file or object systems may have other commands including update commands like TRUNCATE or DELETE that may also for the purposes of this disclosure be considered as write I/O. It will be appreciated that any other update command may also be considered as a write I/O. Additionally, the technique can determine 33 load associated with the first and second storage processor in the data storage system. For example, the state of the load may be determined 34 to be a heavy load or a light load. Moreover, the technique can bypass cache and deliver 35 the write I/O to the plurality of data storage devices in the data storage system in response to determining a heavy load associated with the first and second storage processor in the data storage system. Alternatively, the technique can deliver 36 the write I/O to cache so that the write I/O can be mirrored in the respective cache in response to determining a light load associated with the first and second storage processor in the data storage system.

In one embodiment, the technique can determine the load by monitoring the activity on a communications link that facilitates mirroring between the respective cache in the first and second storage processor. For example, the communications link may be the cache mirror bus 15 of FIG. 1. The technique can determine a heavy load associated with the first and second storage processor in response to monitoring a high amount of activity on the communications link between the cache in the first and second storage processor. Based on determining a heavy load, the technique can bypass cache and deliver the write I/O to the data storage devices. Alternatively, the technique can determine a light load associated with the first and second storage processor in response to monitoring a low amount of activity on the communications link between the cache in the first and second storage processor. Based on determining a light load, the technique can deliver the write I/O to cache. The advantage of monitoring the communications link for activity is that if a bottleneck occurs in the storage processors the technique is immediately aware and may decide to avoid mirroring thereby increasing the overall performance of the system by bypassing cache and delivering write I/O direct to the data storage devices.

In another embodiment, the technique can determine the load by monitoring the CPU utilization in connection with the first and second storage processor. The technique can determine a heavy load associated with the first and second storage processor in response to monitoring a high CPU utilization in connection with the first and second storage processor. Based on determining a heavy load, the technique can bypass cache and deliver the write I/O to the data storage devices. Alternatively, the technique can determine a light load associated with the first and second storage processor in response to monitoring a low CPU utilization in connection with the first and second storage processor. Based on determining a light load, the technique can deliver the write I/O to cache.

In a further embodiment, the technique can determine the load by monitoring the memory bandwidth utilization in connection with the first and second storage processor. The technique can determine a heavy load associated with the first and second storage processor in response to monitoring high memory bandwidth utilization in connection with the first and second storage processor. Based on determining a heavy load, the technique can bypass cache and deliver the write I/O to the data storage devices. Alternatively, the technique can determine a light load associated with the first and second storage processor in response to monitoring low memory bandwidth utilization in connection with the first and second storage processor. Based on determining a light load, the technique can deliver the write I/O to cache.

In a still further embodiment, the technique can determine first and second response times in response to determining the load associated with the respective first and second storage processor. The first and second response times may be the response times for a write-back in the event of delivering the write I/O to mirrored cache and the storage devices, respectively. The decision to deliver the write I/O to the mirrored cache or storage devices may be dependent on the lowest response time. For example, if the load associated with cache in the respective first and second storage processor in the data storage system is a light load, the response time in connection with caching the write I/O may be determined to be lower than the response time of bypassing cache and delivering the write I/O directly to the data storage devices in the backend of the data storage system. Alternatively, if the storage processors present a bottleneck to the write I/O, it may be more efficient to deliver the write I/O directly to the data storage device bypassing the respective caches as the response time may be determined to be substantially similar or even lower.

It is known in the art that cache mirroring can take up substantial resources in the data storage system. For example, the CPU and memory overhead in connection with cache mirroring can be considerable. The advantage of the above technique is that it can manage high bandwidth write requests by optimizing the use of storage processor compute and memory system resources while at the same time improving the throughput achievable on the storage processor. The technique as described does so by dynamically deciding which write I/O to mirror. The technique can improve the overall performance of the system by selectively delivering the write I/O to either cache or direct to data storage devices in response to determining the load associated with the first and second storage processor in the data storage system.

Moreover, it is often stated that one of the advantages of mirrored cache is the response time. However, it has been found that the response time associated with mirrored cache may not be as good depending on the state of the load associated with the first and second storage processor in the data storage system. For example, consider the scenario where there is large amount of data queuing for mirroring. It may be found that in such a scenario the response time in connection with bypassing cache and delivering the write I/O directly to the data storage devices is substantially similar or even better than caching. In view of the foregoing it will be readily apparent to those skilled in the art that, in accordance with the technique as described herein, two similar write I/Os received in the data storage system may be treated differently depending on the load in the system at that particular moment in time.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data storage, the method comprising:
    managing data storage in a data storage system, wherein the data storage system comprises a first and a second storage processor and at least one data storage device, the first and the second storage processor having respective caches configured to mirror each other;
    receiving a write I/O in the data storage system, wherein the write I/O is an operation for updating data storage in the data storage system;
    monitoring load associated with the data storage system;
    in response to monitoring load, determining a first time in connection with caching and mirroring data associated with the write I/O in the respective caches of the first and second storage processors;
    in response to monitoring load, determining a second time in connection with bypassing cache and writing data associated with write I/O to the at least one data storage device; and
    based on the first and second times, determining whether to cache and mirror the data associated with write I/O or bypass cache and deliver the data associated with write I/O to the at least one data storage device, wherein said determination comprises the steps of:
    determining whether the second response time is greater or less than the first response time;
    in response to determining that the second response time is greater than the first response time, delivering the data associated with the write I/O to the respective caches; and
    in response to determining that the second response time is less than the first response time, bypassing cache and delivering the data associated with the write I/O to the at least one data storage device.

2. The method as claimed in claim 1, further comprising:
    monitoring the activity on a communications link facilitating mirroring between the respective cache in the first and second storage processor.

3. The method as claimed in claim 2, further comprising:
    determining a heavy load associated with the first and second storage processor in response to monitoring a high amount of activity on the communications link between the cache in the first and second storage processor.

4. The method as claimed in claim 1, further comprising:
    monitoring CPU utilization in connection with the first and second data storage processor.

5. The method as claimed in claim 4, further comprising:
    determining a heavy load associated with the first and second storage processor in the data storage system in response to monitoring a high amount of CPU utilization in connection with the first and second data storage processor.

6. The method as claimed in claim 1, further comprising:
    monitoring memory bandwidth utilization in connection with the first and second data storage processor.

7. The method as claimed in claim 6, further comprising:
    determining a heavy load associated with the first and second storage processor in the data storage system in response to monitoring a high amount of memory bandwidth utilization in connection with the first and second data storage processor.

8. A system for use in managing data storage, the system comprising:
    a processor comprising a program logic for carrying out the steps of:
    first logic managing data storage in a data storage system, wherein the data storage system comprises a first and a second storage processor and at least one data storage device, the first and the second storage processor having respective caches configured to mirror each other;
    second logic receiving a write I/O in the data storage system, wherein the write I/O is an operation for updating data storage in the data storage system;
    third logic monitoring load associated with the data storage system;
    in response to monitoring load, fourth logic determining a first time in connection with caching and mirroring data associated with the write I/O in the respective caches of the first and second storage processors;
    in response to monitoring load, fifth logic determining a second time in connection with bypassing cache and writing data associated with write I/O to the at least one data storage device; and
    based on the first and second times, sixth logic determining whether to cache and mirror the data associated with write I/O or bypass cache and deliver the data associated with write I/O to the at least one data storage device, wherein said determination comprises the steps of:

seventh logic determining whether the second response time is greater or less than the first response time;

in response to determining that the second response time is greater than the first response time, eighth logic delivering the data associated with the write I/O to the respective caches; and in response to determining that the second response time is less than the first response time, ninth logic bypassing cache and delivering the data associated with the write I/O to the at least one data storage device.

9. The system as claimed in claim 8, further comprising:
tenth logic monitoring the activity on a communications link facilitating mirroring between the respective cache in the first and second storage processor.

10. The system as claimed in claim 9, further comprising:
eleventh logic determining a heavy load associated with the first and second storage processor in response to monitoring a high amount of activity on the communications link between the cache in the first and second storage processor.

11. The system as claimed in claim 8, further comprising:
twelfth logic monitoring CPU utilization in connection with the first and second data storage processor.

12. The system as claimed in claim 11, further comprising:
thirteenth logic determining a heavy load associated with the first and second storage processor in the data storage system in response to monitoring a high amount of CPU utilization in connection with the first and second data storage processor.

13. The system as claimed in claim 8, further comprising:
fourteenth logic monitoring memory bandwidth utilization in connection with the first and second data storage processor.

14. The system as claimed in claim 13, further comprising:
fifteenth logic determining a heavy load associated with the first and second storage processor in the data storage system in response to monitoring a high amount of memory bandwidth utilization in connection with the first and second data storage processor.

\* \* \* \* \*